(12) United States Patent
Ida

(10) Patent No.: US 7,033,064 B2
(45) Date of Patent: Apr. 25, 2006

(54) AREA LIGHT SOURCE APPARATUS

(75) Inventor: Kazushige Ida, Saitama-ken (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 178 days.

(21) Appl. No.: 10/754,719

(22) Filed: Jan. 12, 2004

(65) Prior Publication Data

US 2004/0141309 A1    Jul. 22, 2004

(30) Foreign Application Priority Data

Jan. 14, 2003    (JP) ............................ 2003-005888

(51) Int. Cl.
*F21V 17/00*    (2006.01)
*F21V 8/00*    (2006.01)

(52) U.S. Cl. ...................... 362/634; 362/609; 362/633; 362/627

(58) Field of Classification Search ......... 362/600–634
See application file for complete search history.

(56) References Cited

U.S. PATENT DOCUMENTS

| | | | | |
|---|---|---|---|---|
| 6,055,029 | A * | 4/2000 | Kurihara et al. | 349/65 |
| 6,538,710 | B1 * | 3/2003 | Jang | 349/65 |
| 6,669,356 | B1 * | 12/2003 | Okuno | 362/311 |
| 6,773,127 | B1 * | 8/2004 | Kao | 362/627 |
| 2001/0006461 | A1 * | 7/2001 | Okuno | 362/311 |
| 2003/0231499 | A1 * | 12/2003 | Kao | 362/362 |

FOREIGN PATENT DOCUMENTS

JP    2002-270024    9/2002

* cited by examiner

*Primary Examiner*—Alan Cariaso
*Assistant Examiner*—Adam C. Rehm
(74) *Attorney, Agent, or Firm*—Oblon, Spivak, McClelland, Maier & Neustadt, P.C.

(57) ABSTRACT

Cold cathode tube 22 is covered with lamp reflector 31. An edge portion on the side of incident light surface 26a of light guide 26 is interposed between upper and lower edge portions 31a and 31b of lamp reflector 31. Reflection sheet 29 is attached to the back surface 26b of light guide 26. Reflection sheet 29 is fixed on the front surface of frame 32 by adhesive tapes 41 for electric insulation. An interposing width of "A" where the edge portion on the side of incident light surface 26a of light guide 26 is interposed between upper and lower edge portions 31a and 31b of lamp reflector 31, which is larger than a gap of "B" defined between step portion 35 of frame 32 and edge 26d of light guide 26. With the structure arranged above, the edge portion on the side of incident light surface 26a of light guide 26 is firmly held between upper and lower edge portions 31a and 31b of lamp reflector 31.

8 Claims, 6 Drawing Sheets

FIG. 7 ially rectangular area light conversion member which converts light from the light source into area light to be projected to a front surface of the area light conversion member. One side of the area light conversion member is provided opposite to the light source. An optical sheet is attached to a back surface of the area light conversion member. A reflector covering the light source reflects and projects the light from the light source to the one side of the area light conversion member. Edge portions of the reflector are provided to interpose the one side of the area light conversion member. A frame is faced to support the other side opposite to the one side of the area light conversion member through a gap. A width of the one side of the area light conversion member interposed between the edge portions of the reflector is larger than the gap defined between the frame and the other side of the area light conversion member.

AREA LIGHT SOURCE APPARATUS

FIELD OF THE INVENTION

This invention relates to an area light source apparatus to convert light from a linear light source into area light.

BACKGROUND OF THE INVENTION

A liquid crystal display (LCD) device equipped with an area light source apparatus is primarily used for a display monitor of a notebook type personal computer and other various systems because of its structural features such as thin thickness and light weight. Such an LCD device is provided with a rectangular and flat LCD panel to display video images. The LCD panel is connected to narrow, rectangular and flat driver circuits to supply driving signals through a pair of flexible, narrow and flat flexible printed circuits or tape automated bonding (TAB) units.

On the back of the LCD panel the area light source apparatus is provided for irradiating area light to a display region defined in the central portion of the LCD panel. The area light source apparatus is commonly referred to as the backlight. The LCD panel and the backlight provided opposite to it are interposed between, and held by, a bezel and a frame.

The backlight contains a discharge lamp, i.e., a cold cathode tube used for a long, narrow and linear light source and a light guide which is a rectangular and flat plate like area light conversion member. A long side of the light guide is provided opposite to the cold cathode tube to receive linear light from it so that the light guide converts such linear light into an area one by refraction which is projected from a main plane to the LCD panel. The light guide is made of an optically transparent resin material or the like. Prisms are provided on another plane, i.e., the back surface of the light guide.

The cold cathode tube is covered with a curved sheet-like lamp reflector which is in a C-shape in cross section and is provided along the longitudinal axis to reflect the linear light from the cold cathode tube to the incident light side of the light guide. The both edges of the lamp reflector are fixed at those on the front and back surfaces of the light guide, respectively. A rectangular optical sheet is attached to the front surface to make brightness of the light guide uniform and enhanced. A reflection sheet is attached to the back surface of the light guide to reflect light irradiated from the back side of the light guide to its front surface.

Figure 3:
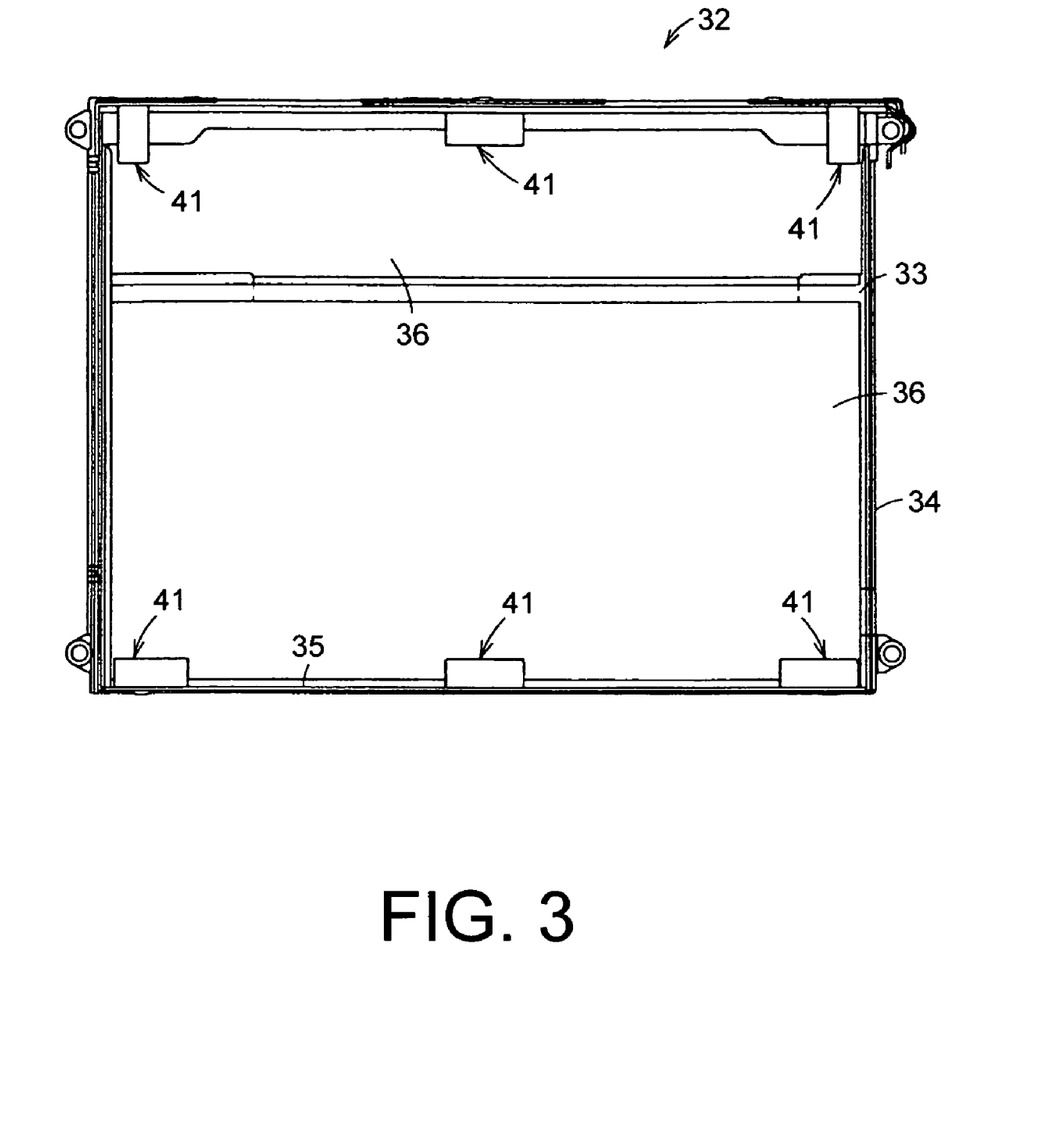
FIG. 3 is a plan view of a frame of the area light source apparatus shown in FIG. 1.
Figure 4:
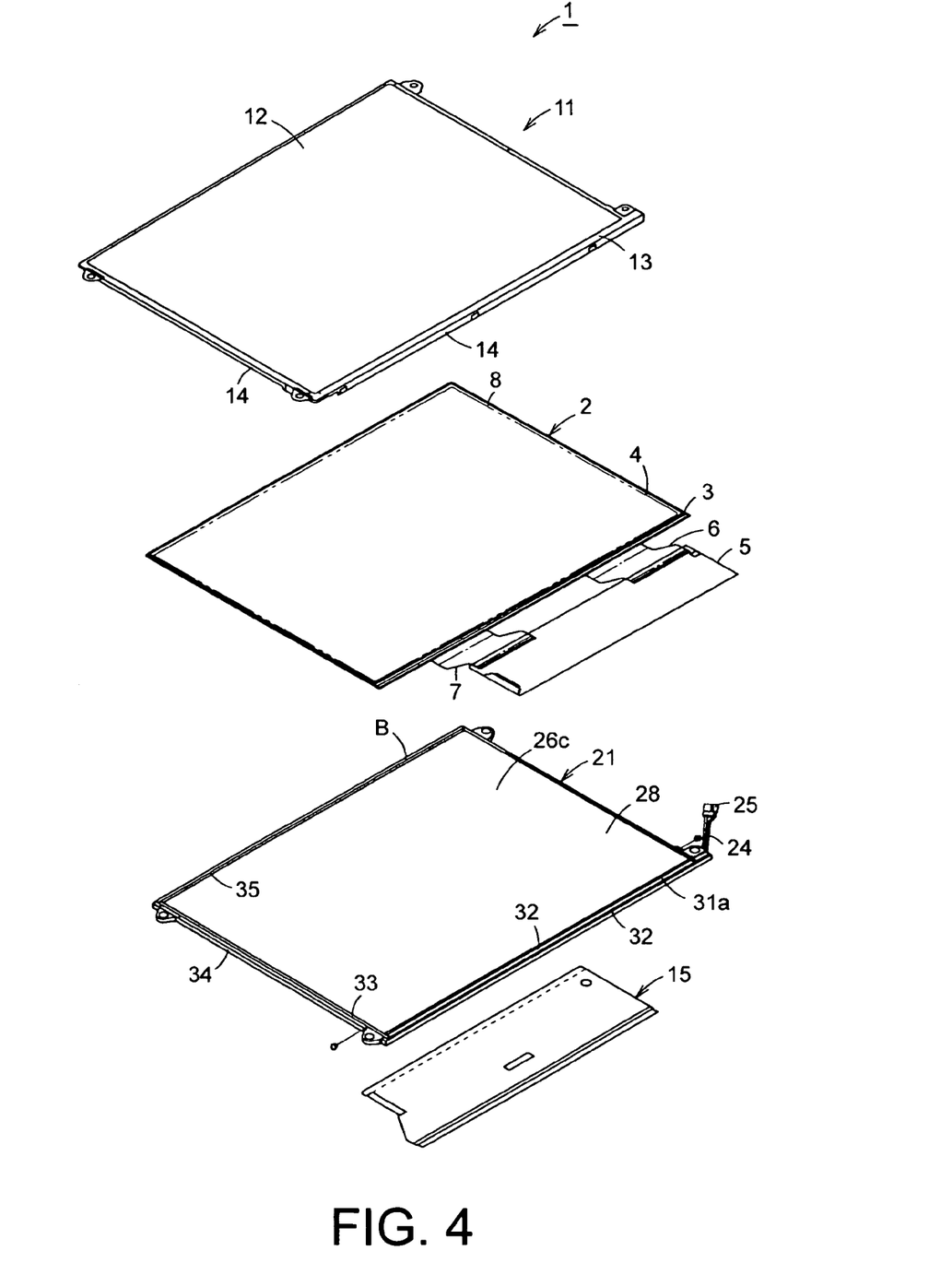
FIG. 4 is a perspective view of disassembled components of an LCD device incorporated with the area light source apparatus shown in FIG. 1.

The lamp reflector is enlarged to effectively reflect light from the cold cathode tube to a side of the light guide, which is interposed between edge portions of the lamp reflector, as disclosed in Japanese Patent Publication No. 2002-270024, pages 3–5 and FIGS. 3 and 4.

With this structure, however, the light guide interferes with the cold cathode tube or the reflection sheet obstructs an optical path from the lamp reflector when the light guide expands by thermal expansion. Thus, it is necessary to define a gap between another side of the light guide and the frame of the LCD device so that it can prevent the backlight from being uneven or degraded brightness. Nevertheless, repeated thermal expansions make the light guide move and separates from the lamp reflector.

SUMMARY OF THE INVENTION

An object of the present invention is to provide an area light source apparatus with a highly reliable structure which is uniform and high in brightness on a given display region.

According to one aspect of the present invention, an area light source apparatus includes a light source and a substantially rectangular area light conversion member which converts light from the light source into area light to be projected to a front surface of the area light conversion member. One side of the area light conversion member is provided opposite to the light source. An optical sheet is attached to a back surface of the area light conversion member. A reflector covering the light source reflects and projects the light from the light source to the one side of the area light conversion member. Edge portions of the reflector are provided to interpose the one side of the area light conversion member. A frame is faced to support the other side opposite to the one side of the area light conversion member through a gap. A width of the one side of the area light conversion member interposed between the edge portions of the reflector is larger than the gap defined between the frame and the other side of the area light conversion member.

With this structure the area light conversion member does not separate from the reflector and the area light source apparatus is uniform and high in brightness.

This patent application is based upon and claims the benefit of priority from the Japanese Patent Application No. 2003-5888, filed on Jan. 14, 2002, the entire contents of which are incorporated herein by reference.

BRIEF DESCRIPTION OF THE DRAWINGS

A more complete appreciation of the present invention and many of the attendant advantages thereof will be readily obtained as the same becomes better understood by reference to the following detailed descriptions when considered in connection with the accompanying drawings, wherein.

DETAILED EXPLANATION OF THE EMBODIMENTS

Embodiments of the present invention will be explained below with reference to the attached drawings. It should be noted that the present invention is not limited to the embodiments but covers their equivalents. Throughout the attached drawings, similar or same reference numerals show similar, equivalent or same components. The drawings, however, are shown schematically for the purpose of explanation so that their components are not necessarily the same in shape or dimension as actual ones. In other words, concrete shapes or dimensions of the components should be considered as described in these specifications, not in view of the ones shown in the drawings. Further, some components shown in the drawings may be different in dimension or ratio from each other.

An area light source apparatus in accordance with the first embodiment of the present invention will be explained with reference to FIGS. 1–4.

A light transmission type LCD device 1 provided with a narrow frame is relatively large in size, portable and thin in thickness. This LCD device 1 includes a substantially rectangular LCD panel 2 which is primarily used for an image display unit of a notebook PC as a light transmission and flat display panel. LCD panel 2 is twelve inches in diagonal, for example, and contains a liquid crystal layer, not shown, as an optical modulator.

LCD panel 2 further includes a thin film transistor (TFT) array substrate 3 and a common substrate 4 provided opposite to TFT array substrate 3. The liquid crystal layer is held between TFT array and common substrates 3 and 4. TFT array and common substrates 3 and 4 are sealed at their peripheral edge portions.

LCD panel 2 is connected to a narrow, rectangular and flat driver circuit board 5 to supply driving signals through a pair of flexible, narrow and flat flexible printed circuits 6 and 7.

Further, LCD panel 2 has a rectangular display screen region 8 to display images. A rectangular frame-like bezel cover 11 is set on the front surface of LCD panel 2. Bezel cover 11 is provided with a main body 13 which is rectangular and frame-like in configuration and defines a rectangular window 12 to expose display screen region 8. Main body 13 has side edges 14 to cover and engage with those of LCD panel 2 when LCD panel 2 receives main body 13.

Backlight 21 is provided as a rectangular, flat and area light source apparatus on the back side of LCD panel 2 to project area light to front display screen region 8. Backlight 21 and LCD panel 2 are received by bezel cover 11 with the front surface of backlight 21 facing the back surface of LCD panel 2.

With the assemblage of backlight 21 and LCD panel 2 set forth above, flexible printed circuits 6 and 7 are bent to dispose driver circuit board 5 connected to LCD panel 2 on the back side of backlight 21. Narrow rectangular sheet 15 is interposed between backlight 21 and driver circuit board 5 for insulation.

Figure 1:
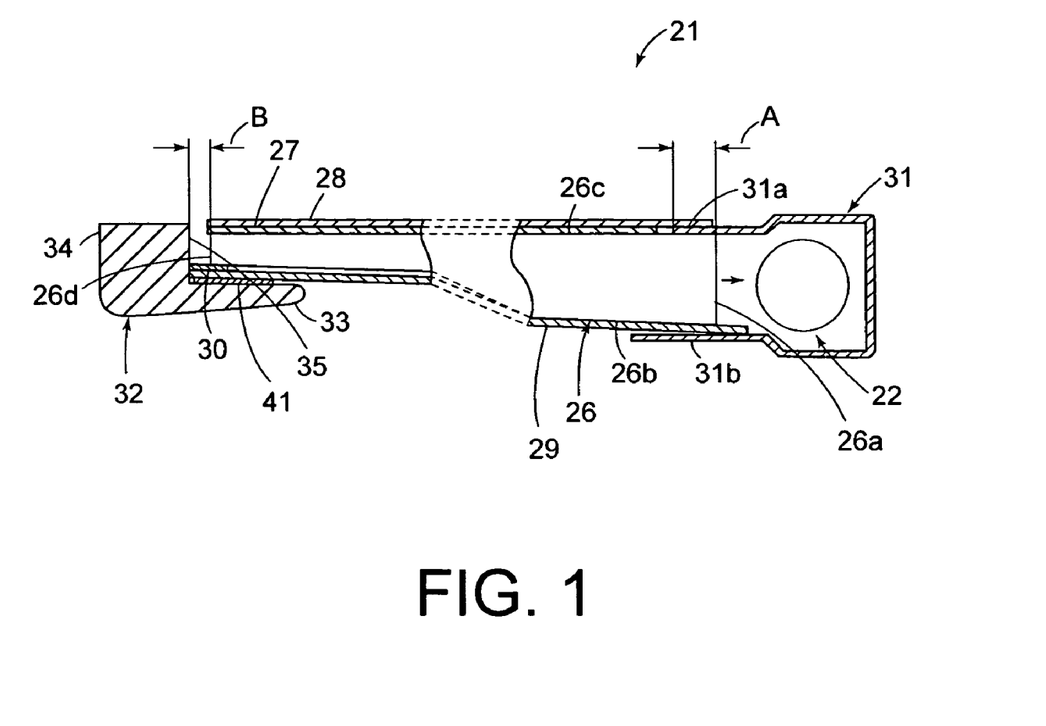
FIG. 1 is a cross-sectional view of an area light source apparatus in accordance with the first embodiment of the present invention.
Figure 2:
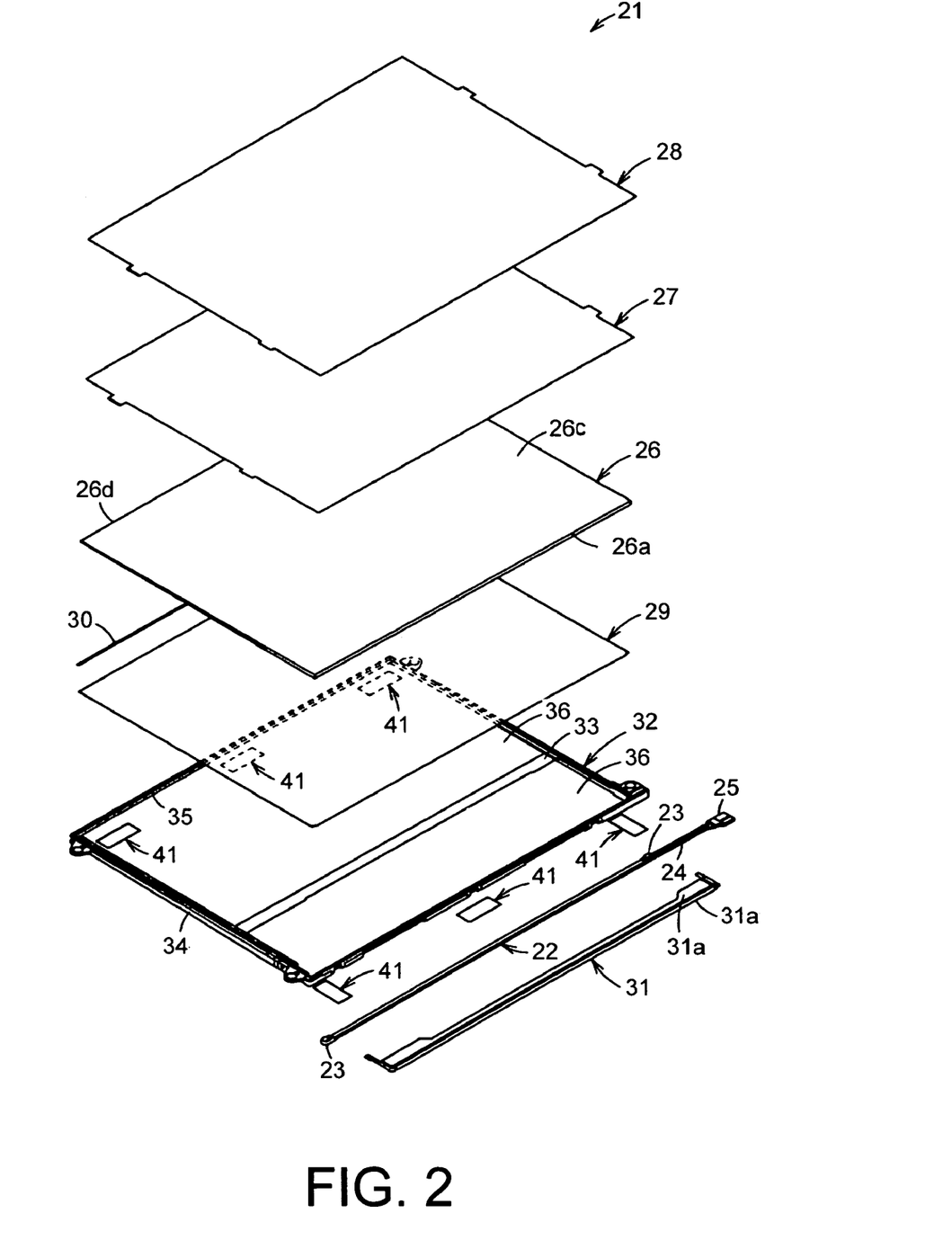
FIG. 2 is a perspective view of disassembled components of the area light source apparatus shown in FIG. 1.

As shown in FIGS. 1 and 2, backlight 21 contains a discharge lamp, i.e., cold cathode tube 22 which is a narrow cylindrical tube light source. Lamp holders 23 are inlaid in both ends of cold cathode tube 22. Terminals of cables 24 on one side are connected to the ends of cold cathode tube 22, respectively, and those on the other side are collectively led to connector housing 25.

The longitudinal axis of cold cathode tube 22 is arranged in parallel with incident light surface 26a of rectangular flat light guide 26 used for a area light conversion member. Light guide 26 is made of transparent resins or the like and prisms are formed on its back surface 26b, i.e., a non-light projecting plane. Incident light surface 26a receives linear light coming from cold cathode tube 22 and leads it to light guide 26. Light is then repeatedly reflected on the inner walls of light guide 26 so that it is converted to area light. The area light is irradiated from front surface 26c to display screen region 8 of LCD panel 2. Thus, front surface 26c constitutes a main plane for projecting light. In order for light guide 26 to uniformly reflect light with respect to front surface 26c, the thickness of light guide 26 gradually decreases from incident light surface 26a to opposite edge 26d. The thickness difference in this arrangement can also secure a receiving space for driving circuit board 5.

Light concentrating sheet 27 is attached to front surface 26c. Light concentrating sheet 27 is rectangular in shape to concentrate light projecting from front surface 26c. Further, the front surface of light concentrating sheet 27 is covered with diffusion sheet 28. Diffusion sheet 28 is also rectangular in shape to diffuse light which comes from front surface 26c and is concentrated by light concentrating sheet 27. Light concentrating sheet 27 and diffusion sheet 28 make brightness distribution over front surface 26 of light guide 26 uniform and the brightness increase.

Back surface 26b of light guide 26 is covered with rectangular reflection sheet 29. One edge of reflection sheet 29 is fixed on back surface 26b of light guide 26 by double-sided adhesive tape 30. Reflection sheet 29 reflects light irradiated from the inside of light guide 26 to back surface 26b and projects it to front surface 26c of light guide 26.

Cold cathode tube 22 provided opposite to incident light surface 26a of light guide 26 is covered along the longitudinal axis with lamp reflector 31. Lamp reflector 31 is bent in a C-shape in cross section to effectively reflect light from cold cathode tube 22 back to incident light surface 26a.

Upper edge portion 31a of lamp reflector 31 is interposed between the edge portion of front surface 26c on the side of incident light surface 26a and diffusion sheet 28 and is disposed at a position closer to incident light surface 26 than the one edge of light concentration sheet 27 provided between light guide 26 and diffusion sheet 28. Lower edge portion 31b of lamp reflector 31 is protruded toward opposite edge 26d of light guide 26 more closely than upper edge portion 31a. Lower edge portion 31b supports edge portions of light guide 26 and reflection sheet 29. Light guide 26 on the side of incident light surface 26a is interposed between upper and lower edge portions 31a and 31b by a width of "A". Incident surface 26a of light guide 26 is disposed to contact with lamp holder 23. Thus, lamp holder 23 prevents light guide 26 from interfering with cold cathode tube 22.

Concentration sheet 27 and diffusion sheet 28 are placed on front surface 26c in order while reflection sheet 29 is put under back surface 26b. Light guide 26 provided with cold cathode tube 22 and lamp reflector 31 on the side of incident light surface 26a is received and held by L-shape frame 32 on its main front surface side. Frame 32 is composed of a strip of main body 33 and peripheral edges 34. Openings 36 are defined by main body 33 and peripheral edges 34 to make frame 32 light in weight.

The inner surface of peripheral edges 34 and the front surface of main body 33 form step portion 35 around the inner periphery of frame 32. Light guide 26 is received by peripheral edges 34 but a clearance gap of "B" is provided between opposite edge 26d of light guide 26 and the up-right surface of step portion 35 along the thickness direction of light guide 26.

The clearance gap of "B" is determined in consideration of thermal expansion of light guide 26 but it is shorter than the width of "A" measured from incident light surface 26a to the edge of upper edge portion 31a of lamp reflector 31 interposing light guide 26 together with lower edge portion 31b. In other words, the width of "A" for the interposition of light guide 26 is larger than the gap of "B" defined between opposite edge 26d and step portion 35, i.e., A>B. The width of "A" ranges from 0.5 mm to 1.5 mm, for example. Preferably, the width of "A" is determined to sufficiently comply with shrinkage of light guide 26 due to a low temperature. In the case that the lowest environmental temperature is −20° C., it is desirable for the width of "A" is larger than the sum of the gap of "B" and the shrinkage quantity caused by temperature changed from the normal temperature of 25° C. to the lowest environmental temperature of −20° C.

Reflection sheet 29 attached to back surface 26b of light guide 26 is fixed on the front surface of main body 33 of frame 32 by a plurality of narrow strips of double-sided adhesive tapes, e.g., six narrow strips of double-sided adhesive tapes 41 for electric insulation. Adhesive tapes 41 are coated with silicon based adhesive materials on the both sides and are disposed on end and central portions of short sides of main body 33 of frame 32. These adhesive insulation tapes 41 and adhesive tape 30 are used for shift suppression means which suppress the shift of light guide 26 toward cold cathode tube 22 or the separation of light guide 26 from frame 32.

More concretely, as shown in FIG. 3, adhesive tapes 41 are set on the front surface of main body 33 of frame 32 at the central and both end portions of one side opposite to incident light surface 26a (see FIGS. 1 and 2). The longitudinal axis of those adhesive tapes 41 is in parallel with that of the lower long side of main body 33. Similarly, adhesive tape 41 is set on the front surface of main body 33 of frame 32 at the central portion of another long side close to incident light surface 26a. The longitudinal axis of adhesive tape 41 is in parallel with that of the lower long side of main body 33. Additional adhesive tapes 41 are set on the front surface of main body 33 of frame 32 at the both end portions of another side close to incident light surface 26a. The longitudinal axis of those adhesive tapes 41 is in parallel with the axes of the short sides of main body 33.

Operations of the first embodiment will be explained below.

Electric energy is supplied to cold cathode tube 22 through housing 25 and cable 24 so that cold cathode tube 22 is turned on to emit linear light.

Linear light emitted from cold cathode tube 22 impinges on incident light surface 26a directly or after reflections on the inner surface of lamp reflector 31.

Incident light on incident light surface 26a is converted into area light by prisms and reflection sheet 29 provided on back surface 26b of light guide 26 and is then projected from front surface 26c.

Subsequently, the light projected from front surface 26c of light guide 26 is concentrated by concentration sheet 27 and passes through diffusion sheet 28 to make brightness distribution of resultant area light substantially uniform and enhanced.

The area light passed through concentration and diffusion sheets 27 and 28 is irradiated to display screen region 8 of LCD panel 2.

The light irradiated to display screen region 8 of LCD panel 2 selectively passes through it so that observers can recognize video images displayed on display screen region 8.

As set forth above, according to the first embodiment of the present invention, the width of "A" measured from incident light surface 26a to the edge of upper edge portion 31a of lamp reflector 31 interposing light guide 26 together with lower edge portion 31b is larger than the gap of "B" provided between opposite edge 26d of light guide 26 received in frame 32 and the up-right surface of step portion 35 along the thickness direction of light guide 26.

Divided adhesive tapes 41 are attached to the end and central portions of the short sides of main body 33 to fix reflection sheet 29 on front surface of main body 33 of frame 32.

According to this embodiment, since the clearance gap "B" is provided between frame 32 and light guide 26, the movement of light guide 26 and reflection sheet 29 toward cold cathode tube 22 caused by thermal expansion of light guide 26, if any, can be reduced. Further, since the width of "A" measured from incident light surface 26a to the edge of upper edge portion 31a of lamp reflector 31 interposing light guide 26 together with lower edge portion 31b is set to be larger than the gap of "B" provided between opposite edge 26d of light guide 26 received in frame 32 and the up-right surface of step portion 35 along the thickness direction of light guide 26, light guide 26 is not disengaged from lamp reflector 31 even though light guide 26 is the farthest away from cold cathode tube 22 because light guide 26 is, repeatedly, thermally expanded and shrunk.

In addition, frame 32 and reflection sheet 29 are fixed by double-sided adhesive tapes 41. Even though reflection sheet 29 is thermally expanded and shrunk with thermal expansion and shrinkage by light guide 26, only adhesive tapes 41 with frame 32 and reflection sheet 29 fixed are expanded and shrunk. Thus, the movement of light guide 26 resulting from such repeated expansions and shrinkages is sufficiently absorbed by reflection sheet 29 as a whole. Here, the adhesiveness of adhesive tape 30 has dependence on temperature. For instance, the adhesiveness becomes weaker as the environment temperature rises while it becomes stronger as the temperature goes down. Light guide 26 expands when the temperature rises but the adhesiveness of adhesive tape 30 becomes strong before light guide 26 shrinks when the temperature goes down. Thus, when the temperature falls, light guide 26 shrinks toward adhesive tape 30 as a reference position. According to this embodiment, since light guide 26 is structured to attach to frame 32 on the opposite side of cold cathode tube 22, such structure effectively prevents light guide 26 from moving toward cold cathode tube 22, even if its expansion and shrinkage are repeated, so that structure also prevents light guide 26 from interfering with cold cathode tube 22.

Double-sided adhesive tapes 41 made of expensive silicon based adhesive materials are divided pieces with predetermined sizes to fix reflection sheet 29 on the front surface of main body 33 of frame 32 at the both ends and central portions of short sides of main body 33. Adhesive tapes 41 partially used for such fixing cost less than the ones to be used for the entire front surface of main body 33. The production cost for backlight 21 can be reduced, accordingly.

Since light guide 26 is interposed between upper portion 31a and lower portion 31b on the side of incident light surface 26a of light guide 26 on the condition that reflection sheet 29 is fixed on back surface 26b of light guide 26, the structure effectively prevents the occurrence of brightness degradation and/or uneven brightness over front surface 26c of light guide 26 resulting from the movement of reflection sheet 29.

Figure 5:
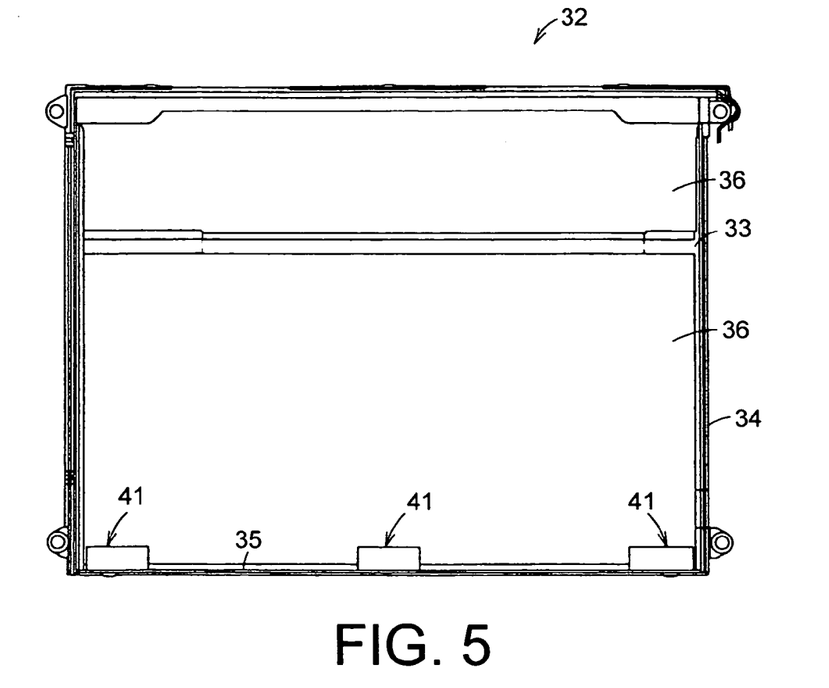
FIG. 5 is a plan view of a frame in accordance with the second embodiment of the present invention.

Although adhesive tapes 41 fix reflection sheet 29 on the front surface of main body 33 of frame 32 at the both ends and central portions of short sides of main body 33 in the first embodiment, as the second embodiment of the present invention shown in FIG. 5 demonstrates, divided adhesive tapes 41 with predetermined sizes may be set on the front surface of main body 33 of frame 32 at both end and central portions of one long side of main body 33 opposite to incident light surface 26a, only.

Figure 6:
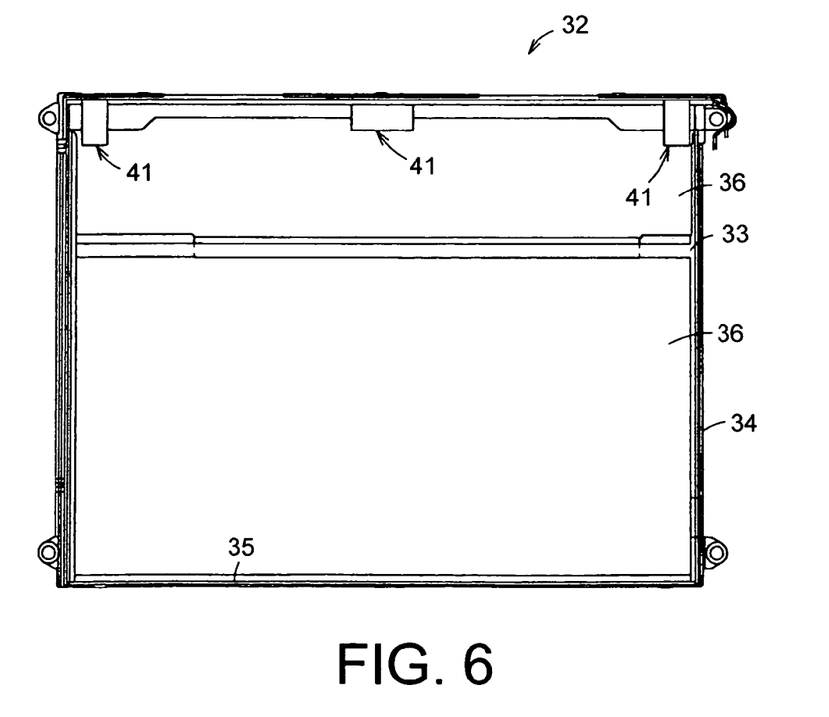
FIG. 6 is a plan view of a frame in accordance with the third embodiment of the present invention.

Further, the third embodiment of the present invention is shown in FIG. 6. In this embodiment, divided adhesive tapes 41 with predetermined sizes may be set on the front surface of main body 33 of frame 32 at both end and central portions of another long side of main body 33 opposite to edge 26d of light guide 26, only.

Figure 7:
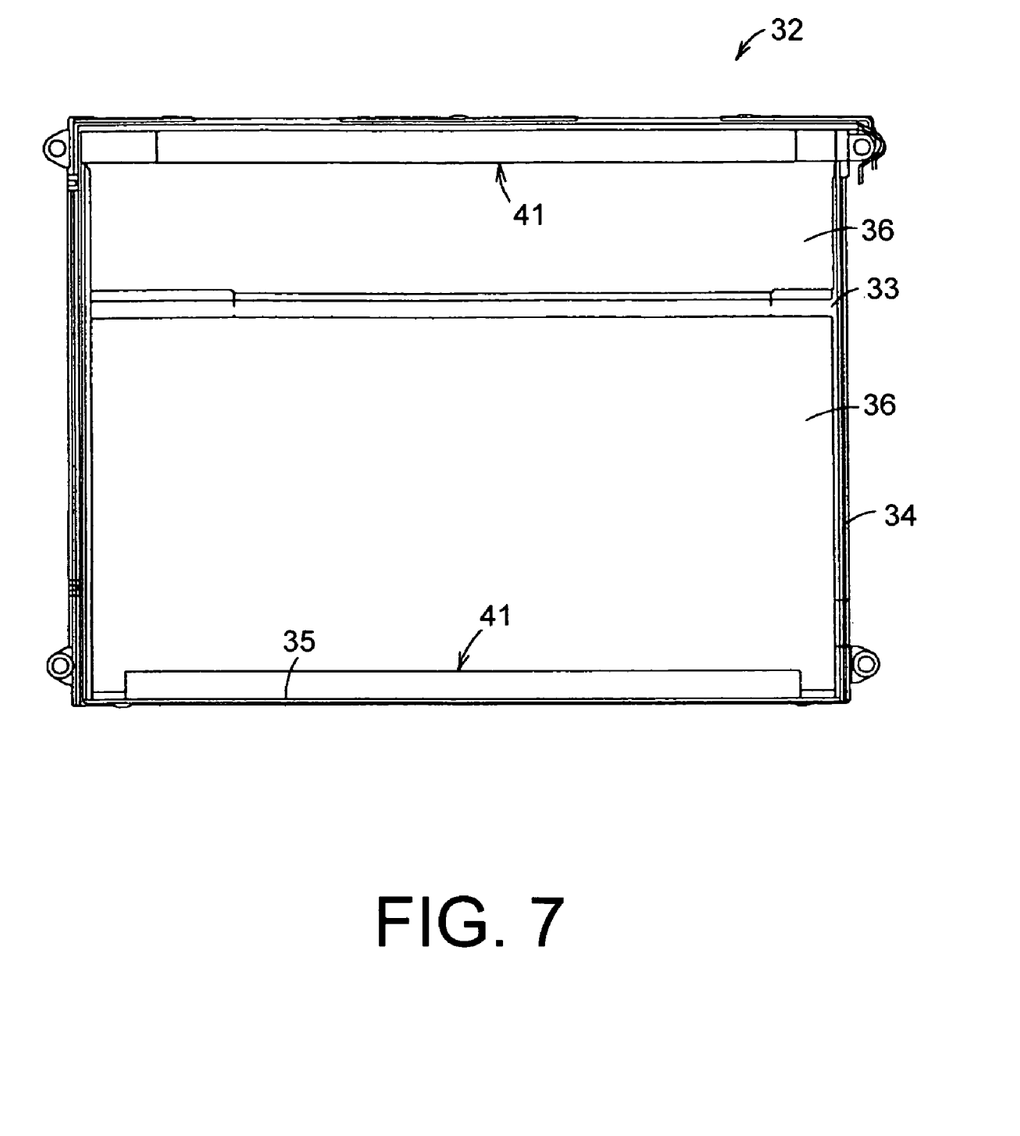
FIG. 7 is a plan view of a frame in accordance with the fourth embodiment of the present invention.

Likewise, in the fourth embodiment of the present invention shown in FIG. 7, strips of adhesive tapes 41 may be set on the front surface of main body 33 of frame 32 along long sides of main body 33 of frame 32.

According to the present invention, an area light conversion member is not put out of joint with a reflector even if it is thermally expanded and shrunk and an area light source with substantially uniform brightness is provided.

What is claimed is:

1. An area light source apparatus comprising:
   a light source;
   a substantially rectangular area light conversion member to convert light from said light source into area light projected to a front surface of said area light conversion member, one side of said area light conversion member having an incident light surface and being provided adjacent to said light source;
   a reflector covering said light source to reflect and project the light from said light source to said one side of said area light conversion member, the reflector including an upper edge portion and a lower edge portion, the upper and lower edge portions of said reflector being provided to interpose said one side of said area light conversion member;
   a frame faced to support the other side of said area light conversion member opposite to said one side of said area light conversion member through a gap; and
   suppression means provided between said area light conversion member and said frame and adjacent to said other side of said area light conversion member for suppressing said area light conversion member to shift toward said light source and front surface of said area light conversion member,
   wherein a width formed by a front edge of the upper edge portion and the incident light surface of said one side of said area light conversion member interposed between said upper and lower edge portions of said reflector, is larger than said gap defined between said frame and said other side of said area light conversion member.

2. An area light source apparatus according to claim 1, wherein said suppressing means is an adhesive tape.

3. An area light source apparatus according to claim 1, further comprising optical sheet provided on an opposite surface to said front surface, wherein said optical sheet together with said area light conversion member is interposed between said upper and lower edge portions of said reflector.

4. An area light source apparatus according to claim 3, wherein said area light conversion member is attached to said frame through said optical sheet.

5. An area light source apparatus according to claim 1, wherein said width of said one side of said area light conversion member interposed between said upper and lower edge portions of said reflector is larger than said gap defined between said frame and said other side of said area light conversion member plus a shrink quantity caused by environmental temperature change from 25° C. to −20° C.

6. An area light source apparatus according to claim 1, wherein said area light conversion member includes a prism provided on a side of a rear surface opposite to said front surface.

7. An area light source apparatus according to claim 1, wherein said suppressing means changes adhesiveness thereof depending on environmental temperatures.

8. An area light source apparatus according to claim 1, further comprising:
   a holder to support both upper and lower edge portions of said light source, wherein said one side of said area light conversion member is disposed to contact with said holder.

* * * * *